United States Patent
Jeon (10) Patent No.: US 7,433,976 B2
(45) Date of Patent: Oct. 7, 2008

(54) DATA COPY METHOD AND APPLICATION PROCESSOR FOR THE SAME

(75) Inventor: Chan-Sik Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 11/348,695

(22) Filed: Feb. 7, 2006

(65) Prior Publication Data

US 2006/0179371 A1    Aug. 10, 2006

(30) Foreign Application Priority Data

Feb. 7, 2005    (KR)    ............... 10-2005-0011114

(51) Int. Cl.
*G06F 13/00* (2006.01)
*G11C 29/00* (2006.01)

(52) U.S. Cl. .......... 710/22; 710/8; 710/9; 710/10; 710/33; 711/4; 711/117; 711/118

(58) Field of Classification Search .......... 710/8–10, 710/22, 23; 711/4, 117, 118
See application file for complete search history.

(56) References Cited

U.S. PATENT DOCUMENTS 7,057,911 B2 * 6/2006 Klint .................... 365/49.1
7,139,909 B2 * 11/2006 Lee ..................... 713/100

FOREIGN PATENT DOCUMENTS

| JP | 20010243171 | 9/2001 |
|---|---|---|
| JP | 20020366429 | 12/2002 |
| KR | 20010036860 | 5/2001 |
| KR | 20030014378 | 2/2003 |

OTHER PUBLICATIONS

English Abstract.
English Abstract.
English Abstract Publication No. 2003-0014378.
English Abstract Publication No. 1020010036860.

* cited by examiner

*Primary Examiner*—Tammara R Peyton
(74) *Attorney, Agent, or Firm*—F. Chau & Assoc., LLC (57) ABSTRACT

A data copy method includes designating data stored in a non-volatile memory device as data packages, reading at least one data package to store the read at least one data package in a temporary memory device, transferring the at least one data package stored in the temporary memory device to a volatile memory device using a direct memory access (DMA) operation, and reading a next at least one data package stored in the non-volatile memory device to store the next at least one data package in the temporary memory device. Transferring the at least one data package and reading the next at least one data package are simultaneously and parallelly performed. The data copy method according to exemplary embodiments of the present invention may improve data copy speed, and may reduce occupancy of a memory bus by performing the auto-loading function and simultaneously and parallelly performing the data package storing process and the data package transferring process.

24 Claims, 8 Drawing Sheets

DATA COPY METHOD AND APPLICATION PROCESSOR FOR THE SAME

CLAIM FOR PRIORITY

This application claims priority to Korean Patent Application No. 2005-11114 filed on Feb. 7, 2005 in the Korean Intellectual Property Office, the contents of which are hereby incorporated by reference.

BACKGROUND OF THE INVENTION

1. Field of the Invention

The present invention relates to a data copy method for copying data to a non-volatile memory and an application processor for the data copy method.

2. Description of the Related Art

Generally, a flash memory device is a type of non-volatile memory device that is capable of maintaining stored data in the event power of the flash memory device is discontinued, and is a type of electrically erasable programmable read-only memory (EEPROM).

The flash memory device is widely used for storing a boot code in terminals, and for secondary storage in mobile systems.

The flash memory device may be classified as either a NOR-type flash memory device or a NAND-type flash memory device.

The NOR-type flash memory device uses an interfacing method of a static random access memory (SRAM) or a read-only memory (ROM).

Thus, it is straightforward to implement a circuit configuration with a processor, and it is possible to perform a high-speed data process. However, there are high manufacturing costs.

Compared with the NOR-type flash memory device, the NAND-type flash memory device has a more complex interfacing method than that of the NOR-type flash memory device.

However, the NAND-type flash memory device has relatively higher integration and relatively lower manufacturing costs.

Therefore, the NAND-type flash memory device is widely used for a memory card of a camcorder, a digital camera or an MP3 player. Additionally, the capacity of the NAND-type flash memory device has been upgraded to about 1 gigabyte (GB) from a more conventional 64 megabyte (MB) capacity.

The speed indicating how quickly data is read from or written to the NAND-type flash memory device determines the performance of an entire system.

Accordingly, the speed indicating how quickly data stored in the NAND-type flash memory device are copied to a volatile memory, such as a synchronous dynamic random access memory (SDRAM) device, is an important factor for improving the performance of an entire system.

In a conventional data copy method, such as a polling method, to copy data stored in the NAND-type flash memory device into the SDRAM, a command signal for reading the data stored in the NAND-type flash memory device is applied, then data stored in the NAND-type flash memory device are stored in a data register of a processor in response to the command signal.

The data stored in the data register are repeatedly stored in a corresponding address space of the SDRAM. The data stored in the NAND-type flash memory device are transferred by page units.

However, in the polling method, after the data stored in the NAND-type flash memory device are stored in the data register, the data stored in the data register are transferred to the SDRAM, which is repeatedly performed until all of the data stored in the NAND-type flash memory device are copied to the SDRAM. As a result, the data processing speed may be decreased.

To increase the processing speed, a direct memory access (DMA) technique is employed.

Figure 1:
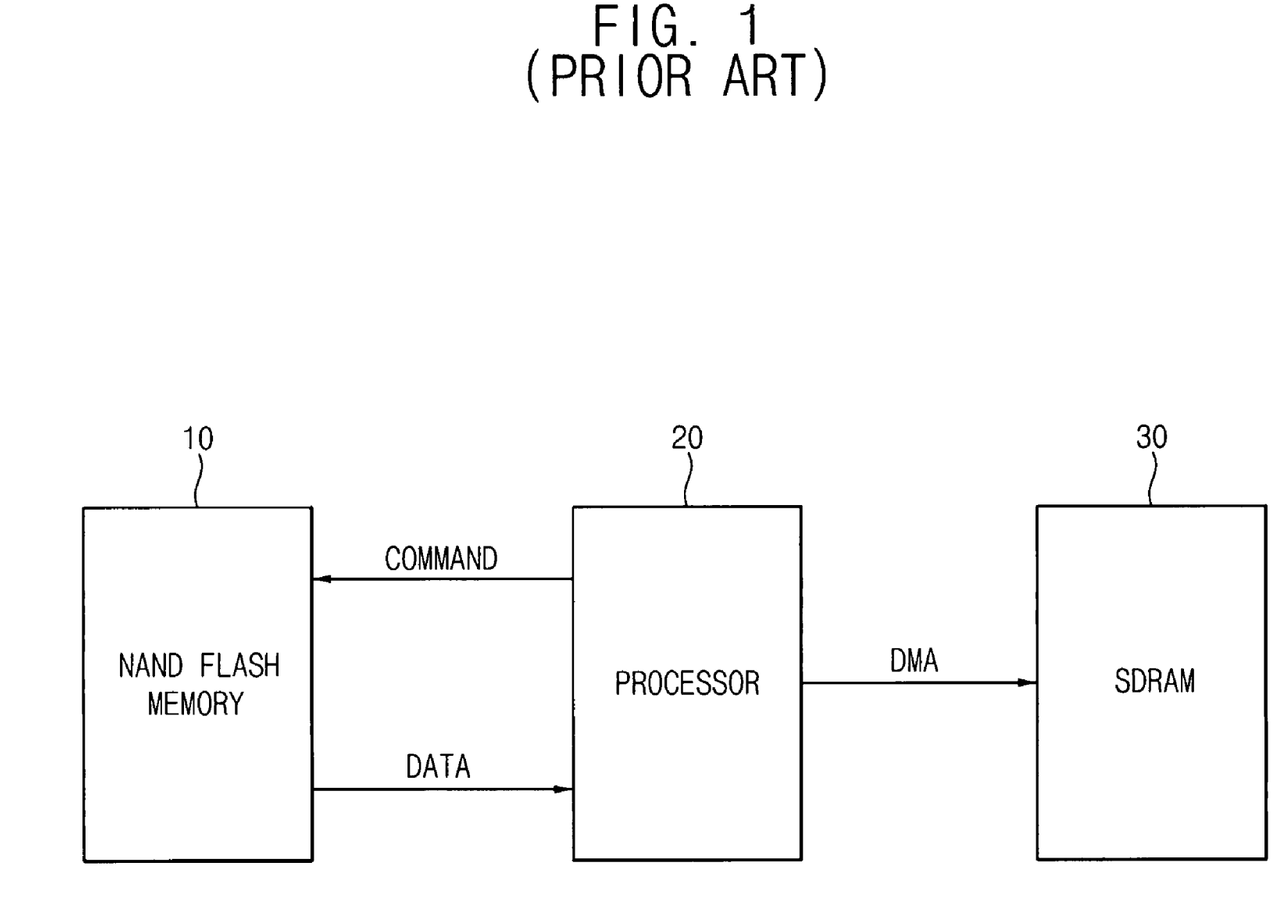
FIG. 1 is a block diagram illustrating a conventional data copy method that copies data stored in a NAND flash memory to a synchronous dynamic random access memory.

FIG. 1 is a block diagram illustrating a conventional data copy method that copies data stored in a NAND flash memory to a synchronous dynamic random access memory.

Referring to FIG. 1, when a processor 20 applies a command signal to a NAND-type flash memory device 10, data stored in the NAND-type flash memory device 10 are stored in a data register (not shown) included in the processor 20 by pages. Then, the data stored in the data register are transferred to an SDRAM 30 by performing a DMA operation.

That is, the data transferred from the NAND-type flash memory device 10 is stored in the data register included in the processor 20, so that the data may then be transferred to the SDRAM 30.

However, the time for the data to be transmitted from the NAND-type flash memory device 10 to the data register included in the processor 20 takes a longer time than that of the DMA operation, through which the data is then transferred to the SDRAM 30.

As a result, the speed benefits obtained from the DMA operation may be lost, and the efficiency of a memory bus may be degraded.

That is, there occurs a data processing time delay between the NAND-type flash memory device to the data register included in the processor 20 and the data register to the SDRAM.

The DMA operation is idle from after the data corresponding to one page are transferred to the SDRAM 30 using the DMA operation until the data corresponding to the next page are stored in the data register, and from after the storing process from the NAND-type flash memory device to the data register until the DMA operation is performed again. Thus, the speed benefit obtained from the DMA operation is lost.

Further, due to the idle time of the DMA operation, unnecessary occupancy time on the memory bus may be increased, thereby degrading the efficiency of the memory bus.

SUMMARY OF THE INVENTION

An exemplary embodiment of the present invention provides a data copy method including designating data stored in a non-volatile memory device as data packages, reading at least one data package to store the read at least one data package in a temporary memory device, transferring the at least one data package stored in the temporary memory device to a volatile memory device using a direct memory access (DMA) operation, and reading a next at least one data package stored in the non-volatile memory device to store the next at least one data package in the temporary memory device, wherein transferring the at least one data package and reading the next at least one data package are simultaneously and parallelly performed.

Transferring the at least one data package and reading the next at least one data package may be repeatedly performed until all of the data packages stored in the non-volatile memory device are copied to the volatile memory device.

The data copy method may further include transferring a last at least one data package to the volatile memory device using the DMA operation after the last at least one data package stored in the non-volatile memory device is stored in the temporary memory device.

The non-volatile memory device may correspond to a NAND-type flash memory device. The volatile memory device may correspond to a synchronous dynamic random access memory. The temporary memory device may correspond to a static random access memory. The data package may have a size of half of a capacity of the temporary memory device.

In another exemplary embodiment of the present invention, a data copy method includes designating data stored in a non-volatile memory device as data packages, loading at least one data package to a temporary memory device to store the loaded at least one data package in the temporary memory device, and transferring the at least one data package stored in the temporary memory device to a volatile memory device using a direct memory access (DMA) operation.

Loading the at least one data package and transferring the at least one data package may be simultaneously and parallelly performed to store a next at least one data package in the temporary memory device.

In another exemplary embodiment of the present invention, an application processor includes a temporary memory device, a non-volatile memory controller configured to repeatedly perform a loading operation including reading at least one data package of data stored in a non-volatile memory device to store the read at least one data package in the temporary memory device, and a direct memory access (DMA) controller coupled to the temporary memory device and a volatile memory device by a memory bus, and configured to control a transfer operation of transferring the at least one data package between the temporary memory device and the volatile memory device.

The loading operation may be performed automatically according to setting values stored in a register. The setting values stored in the register may include a default size of the data package, an address corresponding to each of the data packages and operation commands for automatically performing the loading operation.

The non-volatile memory controller may apply a data package read request signal to the non-volatile memory device, and may store the at least one data package provided from the non-volatile memory device in the temporary memory device.

The non-volatile memory device may correspond to a NAND-type flash memory device. The volatile memory device may correspond to a synchronous dynamic random access memory. The temporary memory device may correspond to a static random access memory.

The temporary memory device may include at least two storage spaces used for writing the at least one data package and used for reading the written at least one data package. A capacity of the temporary memory device may be two times the size of the data package.

The loading operation performed by the non-volatile memory controller and the transfer operation controlled by the DMA controller may be simultaneously and parallelly performed in the temporary memory device.

BRIEF DESCRIPTION OF THE DRAWINGS

The above and other features of the present invention will become more apparent when described using exemplary embodiments thereof with reference to the attached drawings in which.

DESCRIPTION OF THE EMBODIMENTS

Detailed illustrative embodiments of the present invention are disclosed herein. Specific structural and functional details disclosed herein are representative for purposes of describing exemplary embodiments of the present invention. This invention may, however, be embodied in many alternate forms and should not be construed as limited to the embodiments set forth herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Figure 2:
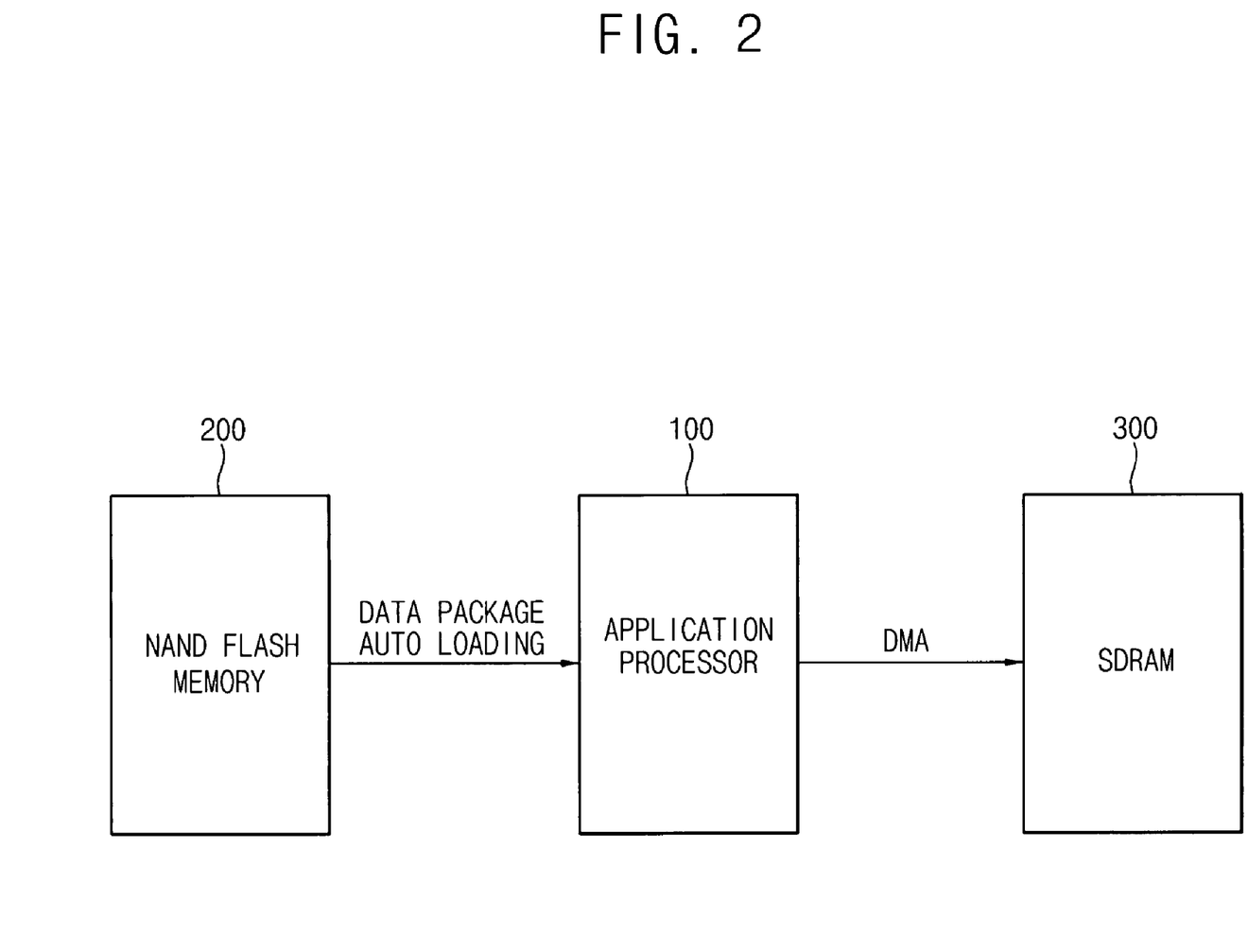
FIG. 2 is a block diagram illustrating a device for implementing a data copy method according to an exemplary embodiment of the present invention.

FIG. 2 is a block diagram illustrating a device for implementing a data copy method according to an exemplary embodiment of the present invention.

Referring to FIG. 2, to implement the data copy method according to an exemplary embodiment of the present invention, a NAND-type flash memory device 200 for data storage, an application processor 100 for high-speed data transfer and an SDRAM 300 as a volatile memory for storing data output from the application processor 100 are employed.

The NAND-type flash memory device 200 may be an external memory device, and the application processor 100 and the SDRAM 300 may be implemented on different chips from each other or on one chip.

The application processor 100 copies data stored in the NAND-type flash memory device 200. Additionally, the application processor 100 may be implemented as an integrated control chip that is capable of performing various functions such as various data conversions, memory control and bus control. However, only the data copy function of the application processor 100 is described.

Figure 3:
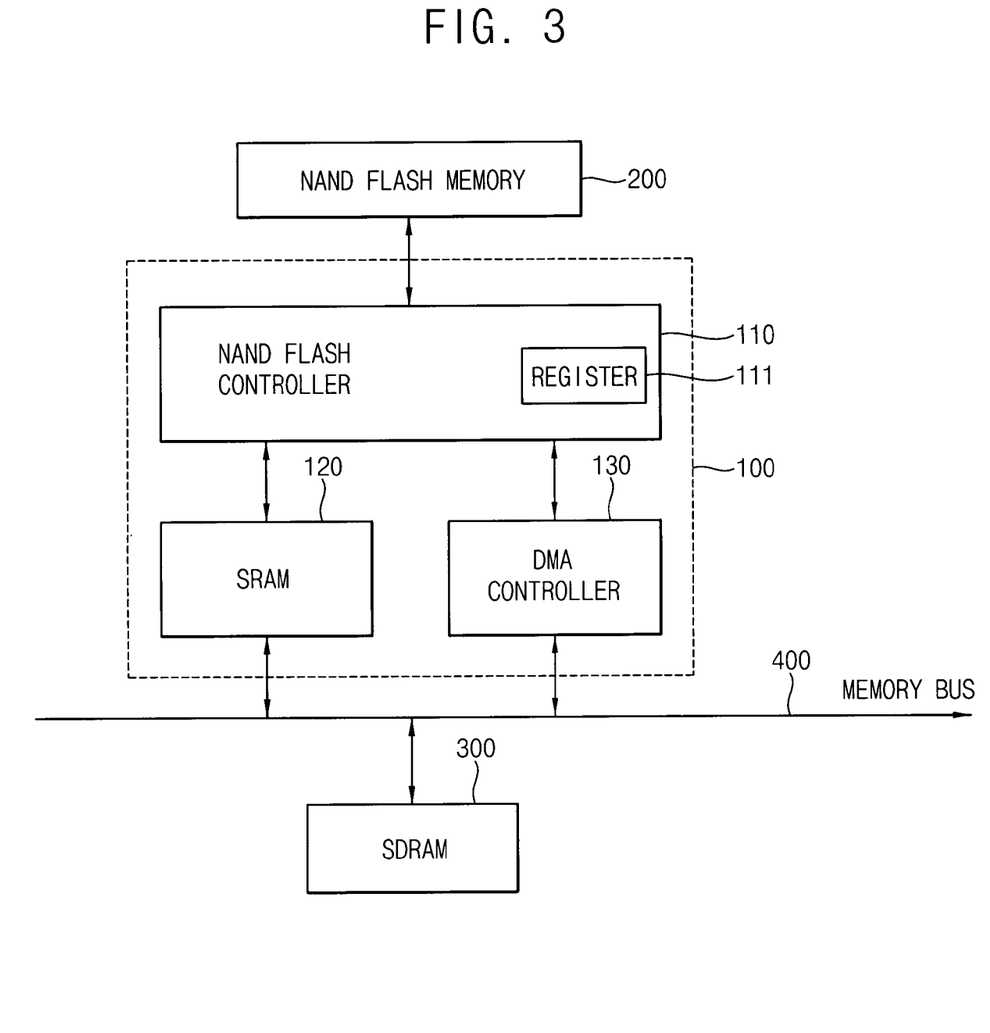
FIG. 3 is a block diagram illustrating an application processor as in FIG. 2 according to an exemplary embodiment of the present invention.

FIG. 3 is a block diagram illustrating an application processor as in FIG. 2 according to an exemplary embodiment of the present invention.

Referring to FIG. 3, the application processor 100 includes a NAND flash controller 110, an SRAM 120 and a DMA controller 130.

The SRAM 120, the DMA controller 130 and an SDRAM 300 are coupled by a memory bus 400.

The NAND flash controller 110 reads data stored in the NAND-type flash memory device 200 by data package units based on setting values stored in a register 111, and stores the read data packages in the SRAM 120, which is called an 'auto-loading' operation.

The NAND flash controller 110 applies a data package read request signal to the NAND-type flash memory device 200, then the NAND flash controller 110 automatically transfers the data package to the SRAM 120 from the NAND-type flash memory device 200 in response to the data package read request signal.

The register 111 included in the NAND flash controller 110 stores setting values including a default size of the data package, an address of the data package to be copied and operation commands for performing the auto-loading function. The auto-loading function is automatically performed based on the setting values stored in the register 111 when a data copy request signal is input from an external CPU (not shown).

The SRAM 120 is used as a temporary memory device, and the data package transferred from the NAND-type flash memory device 200 is stored in the SRAM 120. Then the data package stored in the SRAM 120 is transferred to the SDRAM 300 using the DMA operation.

At the same time, the next data package transferred from the NAND-type flash memory device 200 is stored in the SRAM 120.

The data package includes a plurality of pages, and the size of the data package is equal to half of the storage capacity of the SRAM 120.

The size of the data package is set based on the setting values stored in the register 111.

For example, the storage capacity of the SRAM 120 is about 4 kilobytes (KB), and the size of each of the data packages is about 2 KB corresponding to half of the storage capacity of the SRAM 120.

The size of the data package is set to half of the storage capacity of the SRAM 120 for parallelly performing a data package storing process and a data package transferring process. That is, a first storage space of the SRAM 120 is used for performing the data package storing process and a second storage space of the SRAM 120 is used for performing the data package transferring process.

When a request signal for a data package transfer from the SRAM 120 to the SDRAM 300 is applied to the DMA controller 130, the DMA controller 130 controls the DMA operation so the data package stored in the SRAM 120 is stored in a corresponding address of the SDRAM 300. A burst transmission capable of transferring each item of data in the data package to a plurality of addresses using only a single command is performed, so that each item of data in the data package is stored in a corresponding address of the SDRAM 300.

According to the application processor 100 of the present embodiment, data stored in the NAND-type flash memory 110 is automatically loaded by pages to the SRAM 120 according to settings of register 111 of the NAND-type flash memory 110, and storing operations and transferring operations are simultaneously performed during the DMA operations. As a result, the copying speed is enhanced and memory bus occupation is reduced.

Figure 4:
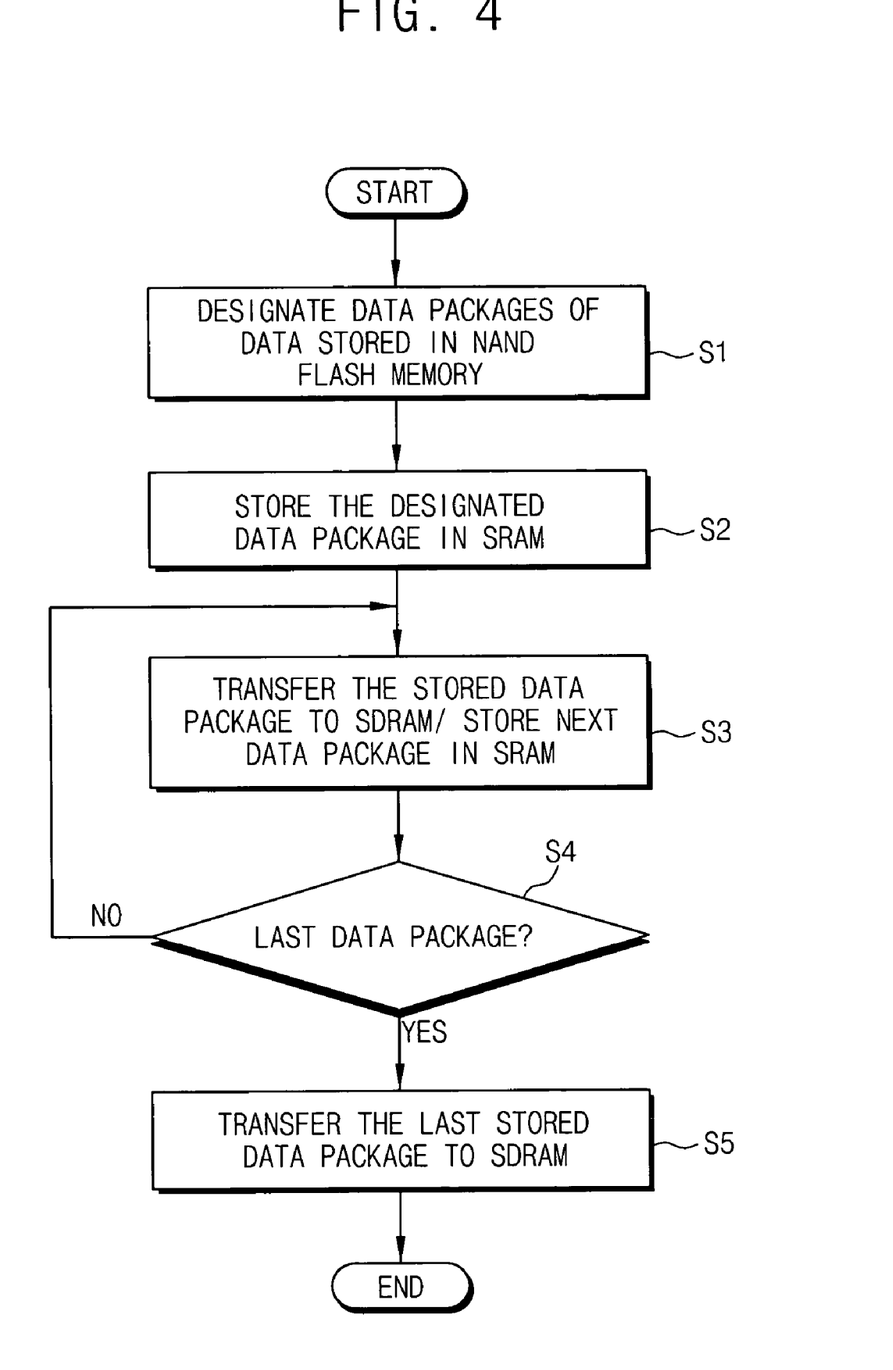
FIG. 4 is a flow chart illustrating a process flow of a data copy method according to an exemplary embodiment of the present invention.

FIG. 4 is a flow chart illustrating a process flow of a data copy method according to an exemplary embodiment of the present invention.

When a data copy request signal is applied from the CPU (not shown), the data stored in the NAND-type flash memory device 200 are designated as each data package based on the setting values stored in the register 111 included in the NAND flash controller 110 S1.

The designated data package is read from the NAND-type flash memory device 200 and then the read data package is stored in the SRAM 120 S2.

The data package stored in the SRAM 120 is transferred to the SDRAM 300 using the DMA operation, and at the same time, the next data package stored in the NAND-type flash memory device 200 is stored in the SRAM 120 S3.

The previous transfer step S3 is repeated until the last data package is stored in the SRAM 120 S4.

When the last data package is stored in the SRAM 120, the last data package is stored in the SDRAM 300 using the DMA operation, thereby completing the data copy process S5.

The data copy method will be explained in more detail referring to FIGS. 5 to 8.

Figure 5:
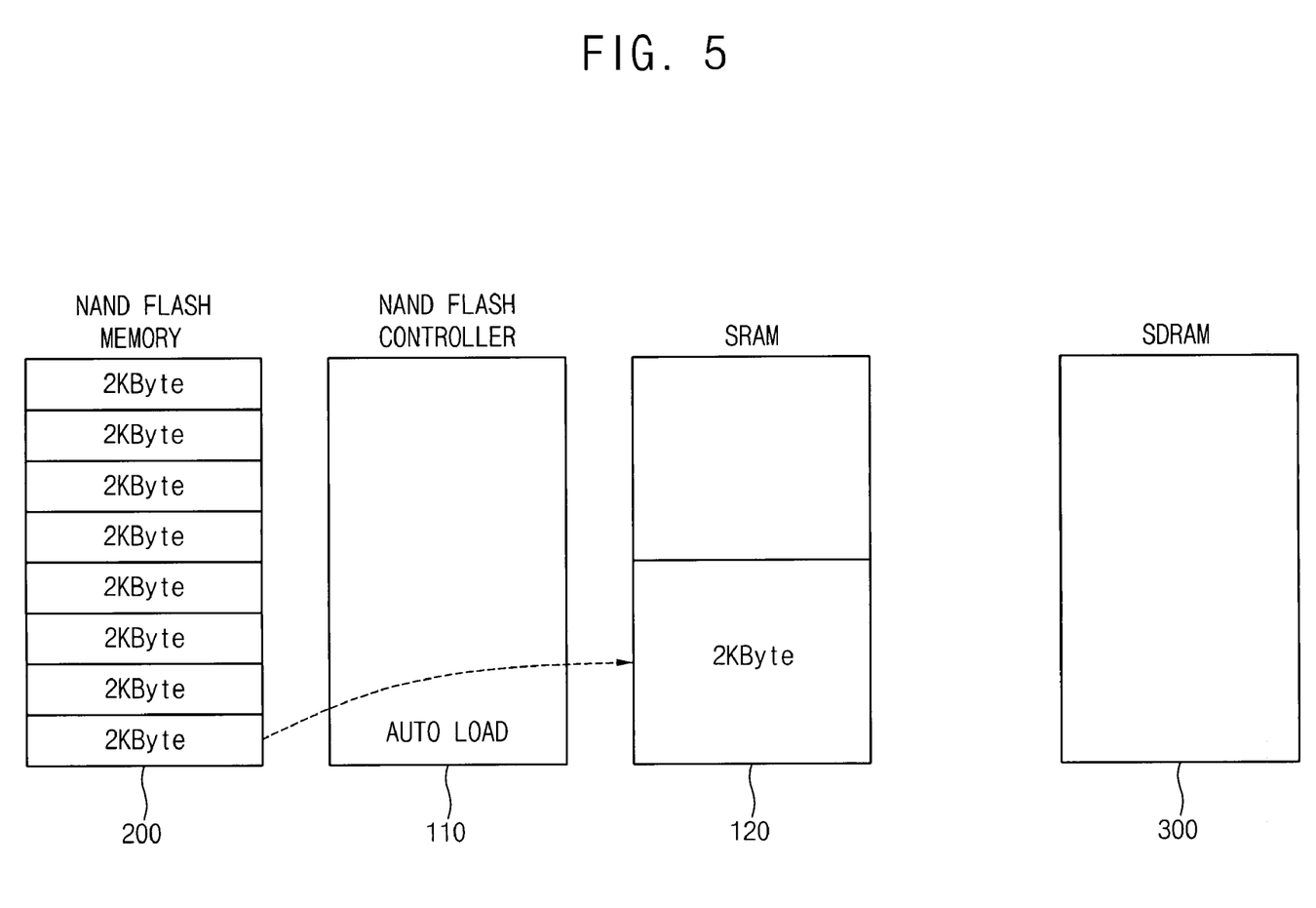
FIG. 5 is a block diagram illustrating a first auto-loading process in which a first data package among data packages stored in a NAND flash memory is stored in a static random access memory according to an exemplary embodiment of the present invention.

FIG. 5 is a block diagram illustrating a first auto-loading process in which a first data package among data packages stored in a NAND flash memory is stored in a static random access memory according to an exemplary embodiment of the present invention.

Referring to FIG. 5, a NAND-type flash memory device 200, a NAND flash controller 110, an SRAM 120 and an SDRAM 300 are included for performing the data copy process.

The NAND flash controller 110 designates a corresponding data package composed of 2 KB to perform the auto-loading operation.

A first data package among a plurality of the data packages is read from the NAND-type flash memory device 200 in response to an auto-loading command of the NAND flash controller 110, then the first data package is stored in the SRAM 120.

The SRAM 120 has a storage capacity of 4 KB that is divided into two storage spaces, a first storage space composed of 2 KB is used for a data package storing process and a second storage space composed of 2 KB is used for a data package transferring process.

Figure 6:
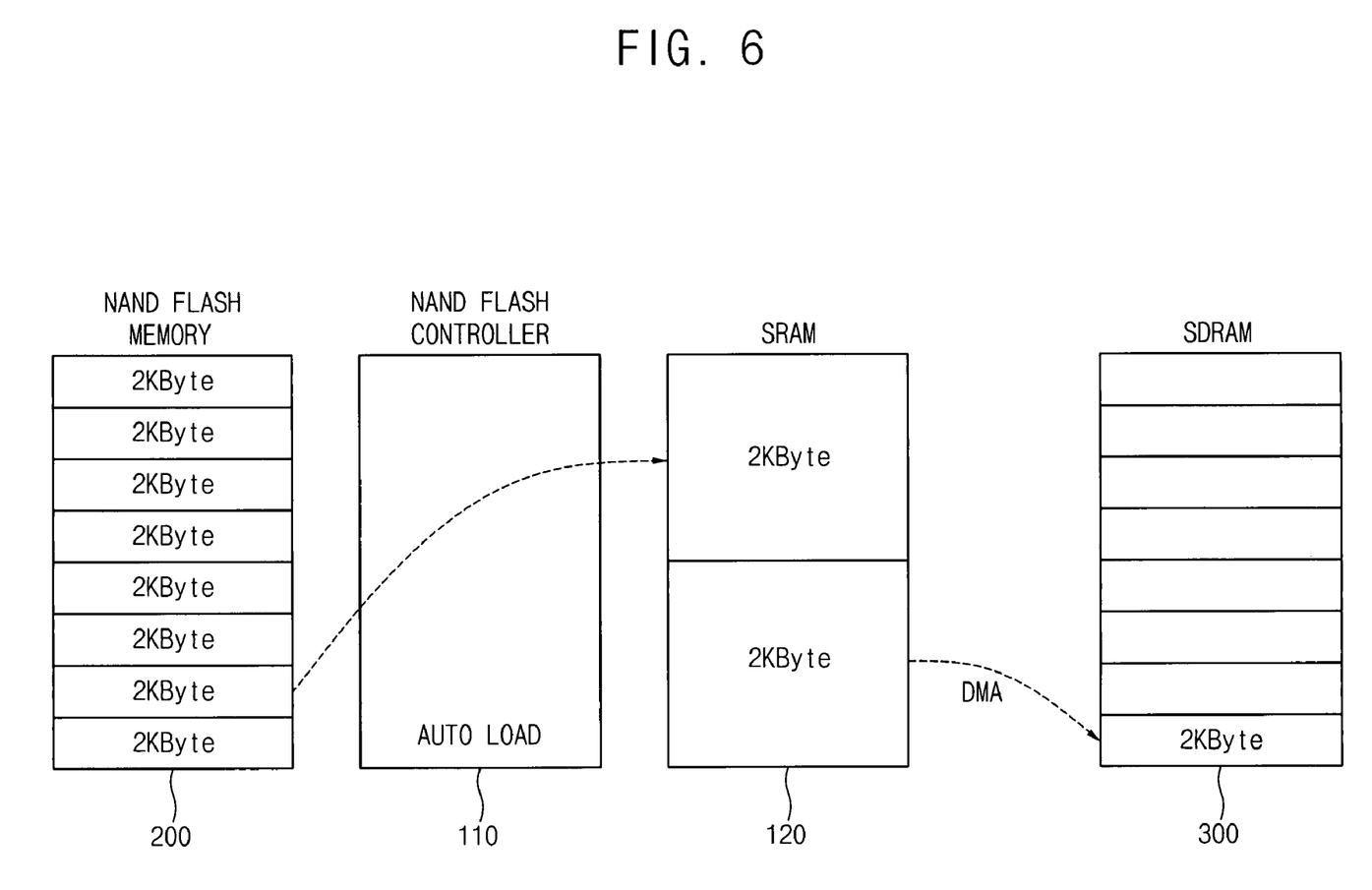
FIG. 6 is a block diagram illustrating a direct memory access operation of a stored first data package and a second auto-loading process of a second data package according to an exemplary embodiment of the present invention.

FIG. 6 is a block diagram illustrating a direct memory access operation of a stored first data package and a second auto-loading process of a second data package according to an exemplary embodiment of the present invention.

As shown in FIG. 6, the first data package was stored in a first storage space of the SRAM 120 and the second data package is stored in a second storage space of the SRAM 120.

For example, the storage capacity of the SRAM 120 is about 4 KB, and the size of each of the data packages is about 2 KB corresponding to half of the storage capacity of the SRAM 120. Accordingly, the first storage space and the second storage space of the SRAM 120 are composed of about 2 KB each.

Referring to FIG. 6, the first data package stored in the first storage space of the SRAM 120 is stored in the SDRAM 300 through the DMA operation, and at the same time, the second data package stored in the NAND-type flash memory device 200 is stored in the second storage space of the SRAM 120.

The auto-loading process and the DMA operation are repeatedly performed until all of the data packages stored in the NAND-type flash memory device 200 are copied to the SDRAM 300.

That is, each of the data packages is continuously stored in the first storage space or the second storage space of the SRAM 120 in response to the auto-loading command stored in the register 111 of the NAND flash controller 110, and at the same time, each of the data packages stored in the first storage space or the second storage space of the SRAM 120 is stored in the SDRAM 300 through the DMA operation.

As a result, the data copy operation that is capable of parallelly performing the auto-loading process and the DMA operation may reduce the waiting time for performing the DMA operation in comparison with a conventional data copy operation whose auto-loading process and DMA operation are serially performed.

Figure 7:
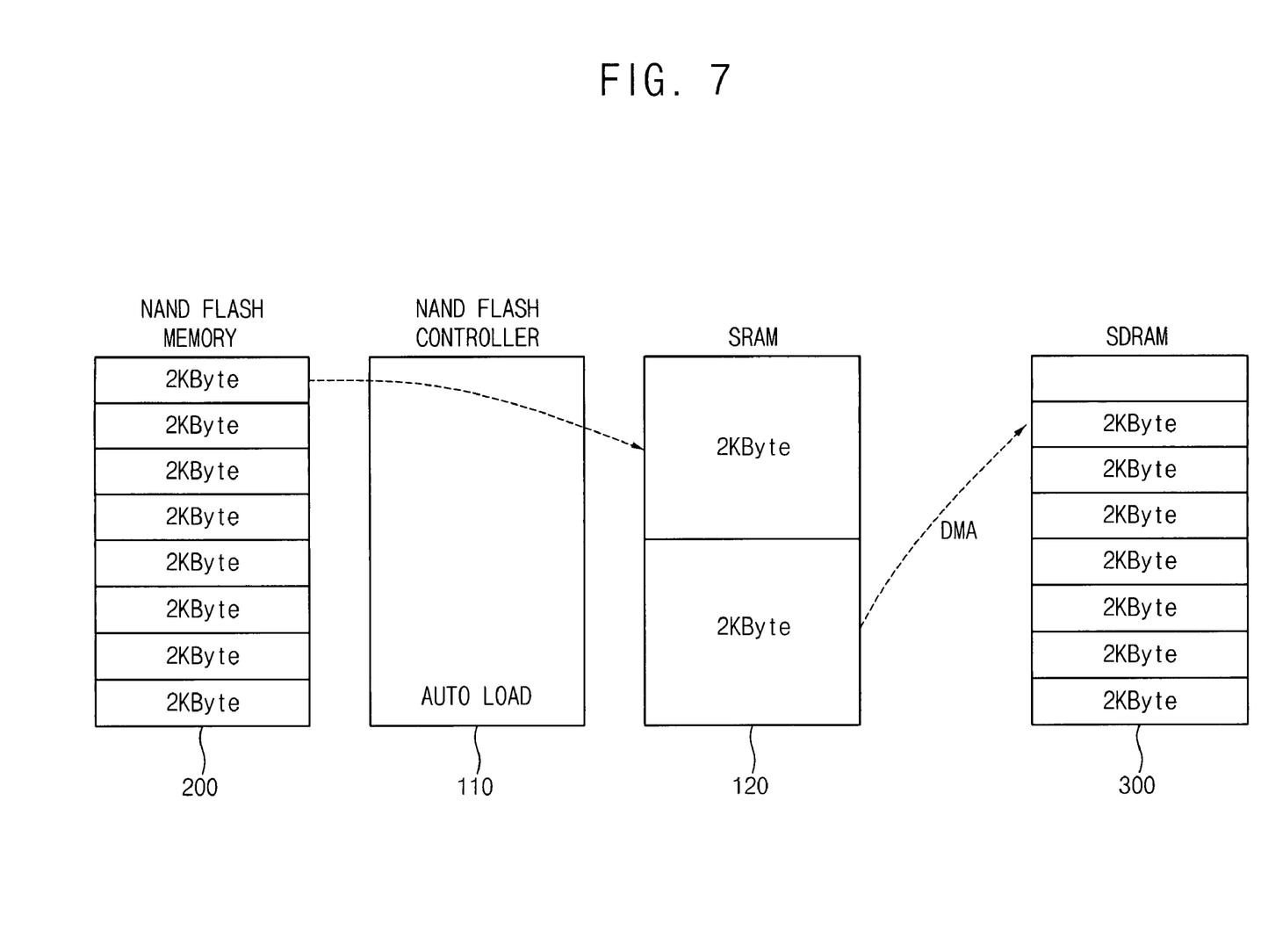
FIG. 7 is a block diagram illustrating a last auto-loading process in which a last data package among data packages stored in a NAND-type flash memory device is stored in a static random access memory according to an exemplary embodiment of the present invention.

FIG. 7 is a block diagram illustrating a last auto-loading process in which a last data package among data packages stored in a NAND-type flash memory device is stored in a static random access memory according to an exemplary embodiment of the present invention.

Referring to FIG. 7, the last data package is stored in the SRAM 120 by the NAND flash controller 110, and at the same time, the previous data package is transferred to the SDRAM 300. Accordingly, the last storage space of the SDRAM 300 is empty.

Figure 8:
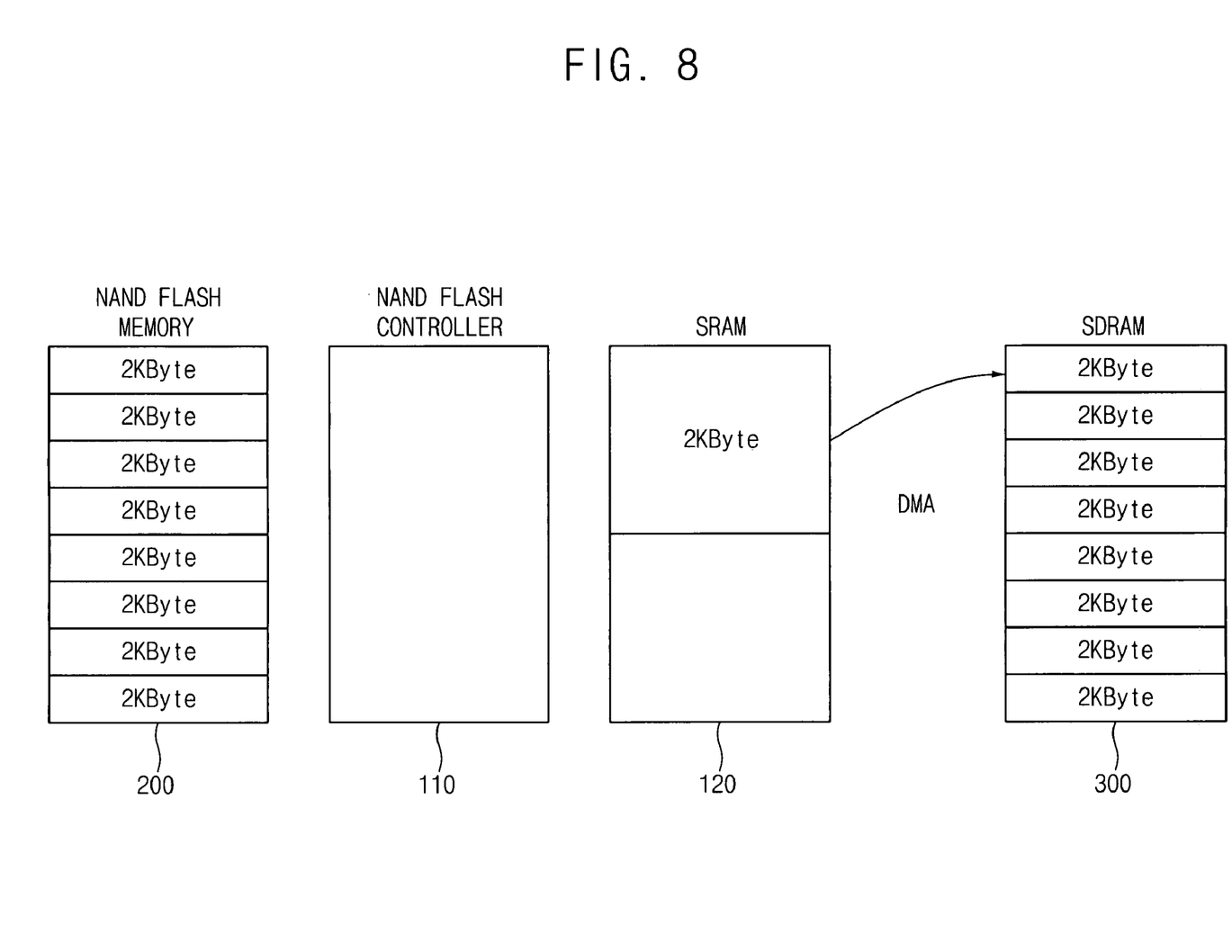
FIG. 8 is a block diagram illustrating a direct memory access operation of a last data package stored in a static random access memory according to an exemplary embodiment of the present invention.

FIG. 8 is a block diagram illustrating a direct memory access operation of a last data package stored in a static random access memory according to an exemplary embodiment of the present invention.

Referring to FIG. 8, the last data package stored in the SRAM 120 through the auto-loading operation of FIG. 7 is now stored in the SDRAM 300 using the DMA operation.

Table 1 shows each of the time periods consumed for performing the data copy operation according to conventional data copy methods such as a polling method and a DMA operation, and an auto-loading and a DMA operation of the present invention. In detail, Table 1 shows a time for copying 29.98 MB stored in the NAND-type flash memory of 'K9S1208 (64 MB×8)' through a CPU of 135 MHz.

TABLE 1

| Transfer Method | Polling (S/W) | DMA (conventional) | Auto-loading & DMA |
|---|---|---|---|
| Time | 14.4 sec | 5.3 sec | 2.96 sec |

As shown in Table 1, the conventional polling method consumes about 14.4 seconds and the conventional DMA operation consumes about 5.3 seconds.

Compared with conventional methods, the data copy method of an exemplary embodiment of the present invention, in which the auto-loading and the DMA operations are parallelly performed, consumes about 2.96 seconds.

The data copy method according to exemplary embodiments of the present invention may reduce the time period consumed for the data copy operation, and may allow the memory bus to be used for performing operations of other circuits by resolving the waiting time for performing the DMA operation.

In the exemplary embodiments of the present invention, the NAND-type flash memory device 200 is used for the non-volatile memory device, the SRAM 120 is used for the temporary memory device, and the SDRAM 300 is used for the volatile memory device.

However, according to alternate embodiments, it is apparent that the NAND-type flash memory device 200, the SRAM 120 and the SDRAM 300 may be substituted with other equivalent elements.

The application processor 100 according to exemplary embodiments of the present invention may improve data copy speed, and may reduce occupancy of the memory bus 400 by performing the auto-loading function and simultaneously and parallelly performing the data package storing process and the data package transferring process.

While features of the exemplary embodiments of the present invention have been described above and in the appended claims, it should be understood that various changes, substitutions and alterations may be made without departing from the spirit and scope of the present invention.

What is claimed is:

1. A data copy method comprising:
designating data stored in a non-volatile memory device as data packages;
reading at least one data package from the non-volatile memory and storing the read at least one data package in a temporary memory device;
transferring the at least one data package stored in the temporary memory device to a volatile memory device using a direct memory access (DMA) operation; and
reading a next at least one data package stored in the non-volatile memory device and storing the read next at least one data package in the temporary memory device, wherein transferring the at least one data package from the temporary memory device and reading the next at least one data package from the non-volatile memory are simultaneously and parallelly performed.

2. The data copy method of claim 1, wherein transferring the at least one data package and reading the next at least one data package are repeatedly performed until all of the data packages stored in the non-volatile memory device are copied to the volatile memory device.

3. The data copy method of claim 1, further comprising transferring a last at least one data package to the volatile memory device using the DMA operation after the last at least one data package stored in the non-volatile memory device is stored in the temporary memory device.

4. The data copy method of claim 1, wherein the non-volatile memory device corresponds to a NAND-type flash memory device.

5. The data copy method of claim 1, wherein the temporary memory device corresponds to a static random access memory.

6. The data copy method of claim 1, wherein the data package has a size of half of a capacity of the temporary memory device.

7. The data copy method of claim 6, wherein the capacity of the temporary memory device is about four kilobytes.

8. The data copy method of claim 1, wherein the volatile memory device corresponds to a synchronous dynamic random access memory.

9. A data copy method comprising:
designating data stored in a non-volatile memory device as data packages;
loading at least one data package from the non-volatile memory to a temporary memory device and storing the loaded at least one data package in the temporary memory device; and
transferring the at least one data package stored in the temporary memory device to a volatile memory device using a direct memory access (DMA) operation, wherein loading the at least on data package and transferring the at least one data package are simultaneously and parallelly performed to store a next at least one data package in the temporary memory device.

10. The data copy method of claim 9, wherein the non-volatile memory device corresponds to a NAND-type flash memory device.

11. The data copy method of claim 9, wherein the temporary memory device corresponds to a static random access memory.

12. The data copy method of claim 9, wherein the data package has a size of half of a capacity of the temporary memory device.

13. The data copy method of claim 12, wherein the capacity of the temporary memory device is about four kilobytes.

14. The data copy method of claim 9, wherein the volatile memory device corresponds to a synchronous dynamic random access memory.

15. An application processor comprising:
a temporary memory device;
a non-volatile memory controller configured to repeatedly perform a loading operation including reading at least one data package of data stored in a non-volatile memory device and storing the read at least one data package in the temporary memory device; and
a direct memory access (DMA) controller coupled to the temporary memory device and a volatile memory device by a memory bus, and configured to control a transfer operation of transferring the at least one data package between the temporary memory device and the volatile memory device,
wherein the loading operation performed by the non-volatile memory controller and the transfer operation controlled by the DMA controller are simultaneously and parallelly performed in the temporary memory device.

16. The application processor of claim 15, wherein the loading operation is performed automatically according to setting values stored in a register.

17. The application processor of claim 16, wherein the setting values stored in the register include a default size of the data package, an address corresponding to each of the data packages and operation commands for automatically performing the loading operation.

18. The application processor of claim 15, wherein the non-volatile memory controller applies a data package read request signal to the non-volatile memory device, and stores the at least one data package provided from the non-volatile memory device in the temporary memory device.

19. The application processor of claim 15, wherein the non-volatile memory device corresponds to a NAND-type flash memory device.

20. The application processor of claim 15, wherein the temporary memory device corresponds to a static random access memory.

21. The application processor of claim 15, wherein the temporary memory device includes at least two storage spaces used for writing the at least one data package and used for reading the written at least one data package.

22. The application processor of claim 21, wherein a capacity of the temporary memory device is two times the size of the data package.

23. The application processor of claim 22, wherein the capacity of the temporary memory device is about four kilobytes.

24. The application processor of claim 15, wherein the volatile memory device corresponds to a synchronous dynamic random access memory.

* * * * *